A. B. SPANGLER.
CULINARY OR KITCHEN UTENSIL.
APPLICATION FILED JUNE 5, 1911.

1,023,226.

Patented Apr. 16, 1912.

Witnesses:
F. Griswold.
E. P. Schlosser.

Inventor
A. B. Spangler
by Obed C. Billman
Attorney

UNITED STATES PATENT OFFICE.

ARTHUR B. SPANGLER, OF AVERY ISLAND, LOUISIANA.

CULINARY OR KITCHEN UTENSIL.

1,023,226.   Specification of Letters Patent.   Patented Apr. 16, 1912.

Application filed June 5, 1911. Serial No. 631,471.

*To all whom it may concern:*

Be it known that I, ARTHUR B. SPANGLER, a citizen of the United States, residing at Avery Island, in the parish of Iberia and State of Louisiana, have invented certain new and useful Improvements in Culinary or Kitchen Utensils, of which the following is a specification.

My invention relates to improvements in culinary or kitchen utensils, and more particularly to an improved rolling pin in which a number of useful kitchen utensils are arranged and combined for ready and convenient use.

The primary object of the invention is to provide a generally improved combination utensil consisting of a hollow pin body provided at one end with a removably mounted cake cutter forming one head, and containing a cylindrical flour container and sifter adapted to be partially withdrawn for use, said sifter having an opening in one end for the introduction of flour and provided with a detachable bearing head or cover carrying a handle forming the opposite handle of the roller pin, said last mentioned handle being provided with a removable dough cutting knife adapted to be carried and concealed within an opening or pocket in the handle.

The invention is adapted to save space in storing the various utensils and to save time in use by reason of the fact that the several utensils are combined and used as above explained.

With the above mentioned and other ends in view, the invention consists in the novel construction, arrangement, and combination of parts, hereinafter described, illustrated in some of its embodiments in the accompanying drawings, and particularly pointed out in the appended claims.

Figure 1:
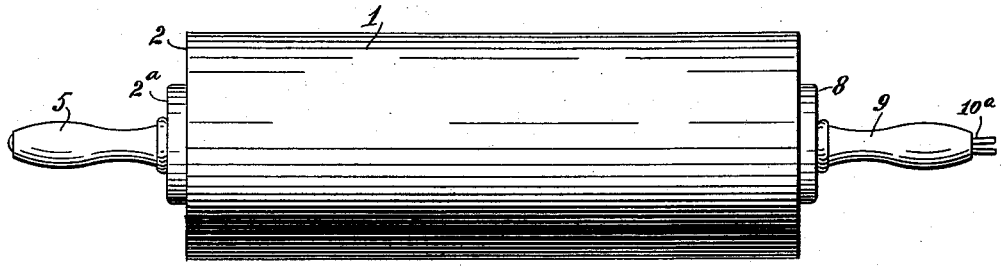
Figure 2:
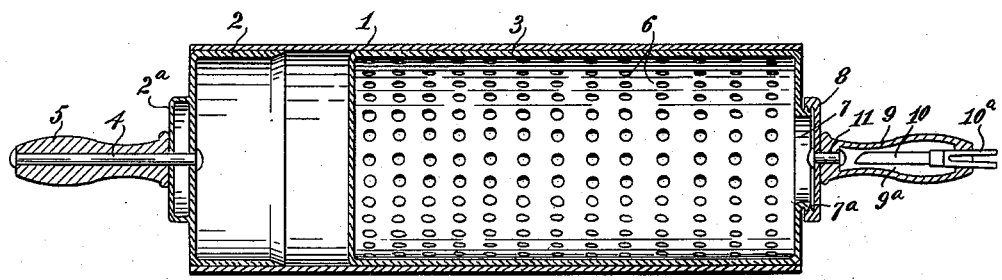
Figure 3:
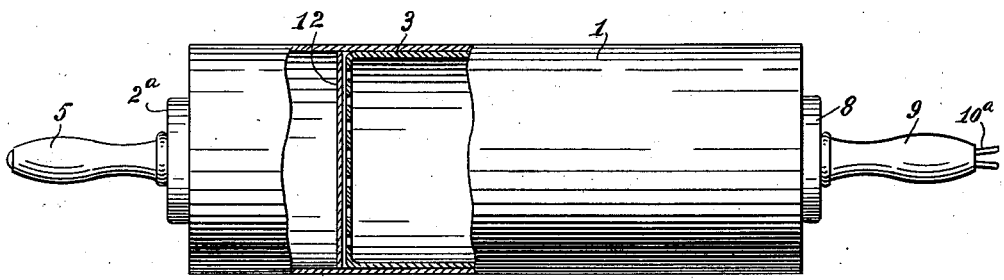
Figure 4:
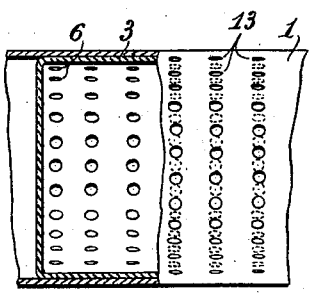

Referring to the drawings, forming a part of this specification, Figure 1, is a side elevation of the improved utensil with the parts assembled for use as an ordinary rolling pin. Fig. 2, a longitudinal sectional view of the same. Fig. 3, a view of a modified form of the same, a portion of the walls being broken away for the purpose of clearer illustration of the parts. Fig. 4, a fragmentary view partly in plan and partly in section, of a further modified form of same.

Similar numerals of reference designate like parts throughout all the figures of the drawings.

The improved culinary or kitchen utensil comprises an open ended hollow cylindrical pin body 1, provided at one end with a removably mounted cake cutter cup 2, and adapted to receive and contain a cylindrical flour container and sifter 3. The cake cutter 2, is slidably mounted within one end of the pin body and is preferably provided with a bearing head $2^a$, carrying a bearing pin 4, provided with a rotatably mounted handle 5. The handle 5, forms one of the roller pin handles when the cake cutter is not in use as shown in the drawings, and is used in the ordinary operation of the cake cutter cup when the latter is removed.

The flour container is provided with a plurality of openings 6, preferably formed in its cylindrical walls as shown in Figs. 2, and 4, and is provided at its end with an opening or mouth 7, through which the container may be filled or replenished with flour. The mouth 7, is normally closed by means of a detachable bearing head or cover 8, said head or cover being preferably flanged and threaded upon a threaded flanged portion $7^a$, about the flour receiving opening or mouth 7, of the flour container. The bearing head is provided with a handle 9, said handle being provided, in the present instance, with an opening or pocket $9^a$, adapted to removably receive and contain a dough knife 10, and as a means for removably securing the knife 10, within the handle 9, said knife is provided with a forked or bifurcated spring handle $10^a$, the free ends of said spring handle projecting slightly beyond the end of the handle 9, as shown. The handle 9, is rotatably secured to the bearing head or cover 8, by means of a bearing pin 11.

If desired, the openings 6, may be formed in the inner end of the flour container, and said openings of the end normally closed by means of a partition plate or disk 12, as shown in Fig. 3; or the cylindrical portion of the pin body 1, may be provided with a plurality of openings 13, similarly spaced to the openings 6, in the cylindrical portion of the flour container as shown in Fig. 4, whereby the openings 6, and 13, may be brought into and out of registry with each other, and when the openings are brought into registry with each other the flour may be distributed by the mere revolution or operation of the rolling pin in an obvious manner and without partially or entirely withdrawing the flour container and sifter from the body of the pin as contemplated in the forms shown in Figs. 1, 2, and 3, of the drawings.

From the foregoing description, taken in connection with the accompanying drawings, the operation and advantages of my invention will be readily understood.

Having thus described some of the embodiments of my invention what I claim and desire to secure by Letters Patent is,—

1. In a culinary utensil, a hollow pin body, a perforated flour container slidably mounted therein and provided with a flour receiving opening at one end, a detachable head cover normally closing said opening, a hollow pin handle rotatably secured to said head cover, and a dough knife having a forked spring handle resting in said hollow handle and projecting therefrom.

2. A culinary utensil, comprising an open ended pin body, a cutter cup removably mounted in one end and provided with a bearing pin, a handle rotatably mounted on said pin, a perforated flour container slidably mounted within said pin body closed at its inner end and having a flanged flour receiving opening at the outer end, a bearing head threaded over said flanged flour receiving opening, and a handle rotatably mounted on said bearing head.

In testimony whereof I have affixed my signature in presence of two witnesses.

ARTHUR B. SPANGLER.

Witnesses:
L. F. HAYES,
H. W. BAINES.

---

Copies of this patent may be obtained for five cents each, by addressing the "Commissioner of Patents, Washington, D. C."